United States Patent
Izumo

(10) Patent No.: US 7,858,013 B2
(45) Date of Patent: Dec. 28, 2010

(54) INJECTION MOLDING METHOD

(75) Inventor: Norifumi Izumo, Hamamatsu (JP)

(73) Assignee: Suzuki Motor Corporation (JP)

( * ) Notice: Subject to any disclaimer, the term of this patent is extended or adjusted under 35 U.S.C. 154(b) by 0 days.

(21) Appl. No.: 12/190,331

(22) Filed: Aug. 12, 2008

(65) Prior Publication Data

US 2009/0057949 A1 Mar. 5, 2009

(30) Foreign Application Priority Data

Aug. 28, 2007 (JP) ............................. 2007-220983

(51) Int. Cl.
*B29C 45/14* (2006.01)

(52) U.S. Cl. .................... 264/274; 264/271.1; 264/250; 425/130; 425/120

(58) Field of Classification Search ................. 425/130, 425/120; 264/274, 250, 271.1
See application file for complete search history.

(56) References Cited

U.S. PATENT DOCUMENTS

| 7,108,825 | B2 * | 9/2006 | Dry et al. ................. 264/328.7 |
| 2001/0014380 | A1 * | 8/2001 | Kobayashi et al. .......... 428/192 |
| 2003/0003828 | A1 * | 1/2003 | Ellison et al. .............. 442/268 |

FOREIGN PATENT DOCUMENTS

| JP | 45-6947 B | 3/1970 |
| JP | 11-208408 | 8/1990 |
| JP | 06-297504 | 10/1994 |
| JP | 11-207782 | 8/1999 |
| JP | 2000-052416 | 2/2000 |
| JP | 2000-210978 | 8/2000 |
| JP | 2000210978 A * | 8/2000 |
| JP | 2000-263599 | 9/2000 |
| JP | 2003-220623 * | 5/2003 |
| JP | 2003-220623 | 8/2003 |
| WO | WO 2005/068154 A1 | 7/2005 |
| WO | WO 2006/138310 A1 | 12/2006 |

OTHER PUBLICATIONS

JP 2000210978 A (English Abstract).*
JP2003-220623 (English Abstract).*
JP 2000210978 A (Machine Translation).*
JP2003-220623 (Machine Translation).*
Notification of the First Office Action corresponding to Chinese Application No. 200810213916.X mailed Jul. 27, 2010.

* cited by examiner

*Primary Examiner*—Khanh Nguyen
*Assistant Examiner*—Margaret Squalls
(74) *Attorney, Agent, or Firm*—Myers Bigel Sibley & Sajovec, PA

(57) ABSTRACT

Die assembly (21, 22), which includes slide die halves (23, 24) and can define a primary molding section (21a, 22a) and a secondary molding section (22b, 23b) adjacent to the primary molding section according to the positions of the slide die halves, are used. After a preformed film (10) is inserted into the primary molding section, a first resin material has been injected into the primary molding section so as to mold a first part (11), and then a second resin material is injected into a secondary molding section (22b, 23b and 23a, 24a) including a part of the surface of the film of the first part as a joint surface (10a), by which a second part (12a, 12) that is joined to the first part via the joint surface is molded.

3 Claims, 5 Drawing Sheets

INJECTION MOLDING METHOD

CROSS-RELATED APPLICATIONS

This application claims priority from Japanese Patent Application No. 2007-220983; filed Aug. 28, 2007, the disclosure of which is incorporated herein by reference in its entirety.

FIELD OF THE INVENTION

The present invention relates to an injection molding method, and more particularly, the present invention relates to a composite molding method in which film insert molding and two-color molding are combined.

BACKGROUND OF THE INVENTION

Conventionally, plastic molded components having light weight, high strength, and high durability have often been used for interior and exterior parts of automobiles, such as garnishes, grilles, instrument panels, trims, bezels, covers, and lamp housings. In the case in which two or more kinds of textures (metal, wood grain) or color tones are represented by a single plastic molded component, although post-treatment such as painting or plating can be performed, a molding method, such as insert molding and two-color molding utilizing, a molding process is advantageous in terms of manufacturing cost and durability. As the two-color molding, there are available a rotary system (JP45-6947B) in which after primary molding, a die or a molding section is rotated to perform secondary molding, and a core back system (JP3203870B, JP3267230B, JP2000-210978A, JP11-207782A) in which after primary molding has been performed by dividing the interior of the molding section by a slide core, secondary molding is performed by retracting the slide core.

In these molding methods, parts must be integrated mutually in terms of shape, or they must be integrated by the mutual adhesive properties of resin materials. For example, in the case of two-color molding for multi-coloring, usually, it is advantageous to secure joint strength by using the same kind of resin materials. However, in some cases, the integral shape of a boundary part cannot be set due to restrictions as to shape of the molded component, or the joint area cannot be secured sufficiently. Furthermore, in some cases, each part places demands on the material, for example, demands on function or demands on cost, so that a combination of dissimilar materials having low mutual adhesive properties is desired. In such cases, it is difficult to perform two-color molding.

On the other hand, in some cases, film insert molding is performed to decorate the member surface (JP2000-52416A, JP2003-220623A, JP2000-263599A). In the film insert molding, by selecting raw materials of layers of the film having a multilayer structure, desired adhesive properties are obtained. For example, a film having a three-layer structure, in which a transparent film is decorated by printing or metal deposition, a weather-resistant protective film is adhered to the top surface side, and a film for joining is adhered to the back surface side, is used and insert-molded, by which the film is integrated with a resin material serving as a base.

The above-mentioned insert film must be preformed to be set in a die. Also, an edge end portion appearing in appearance after molding must be trimmed. However, unlike the ordinary insert molding, the film insert molding method has a problem in that the trimming line is easily shifted by the flow of resin and the thermal shrinkage of film itself at the time of molding. Furthermore, since deposited metal in the film middle layer is exposed on the trimming line, in the case in which the molded component is used for an exterior part of an automobile, there arises a problem in that the exposed deposited metal may cause corrosion or peeling. For these reasons, in the film insert molding, the trimming line is not set in a design surface. In general, the whole of the member is covered with the insert film, including the case in which the textures or color tones are changed over in the decorating layer of insert film. Unlike the ordinary inert molding and the two-color molding, the film insert molding has not been used to produce two or more kinds of textures or color tones by a single plastic molded component.

BRIEF SUMMARY OF THE INVENTION

The present invention has been made in view of the above circumstances, and accordingly, an object thereof is to provide an injection molding method that enables the changeover of textures and color tones by using partial film insert molding, enables two-color molding using two or more kinds of resin materials having low mutual adhesive properties, and enables the selection of various materials according to required function and product cost.

As a result of extensive research conducted to solve the problems in the related art, knowledge was gained showing that the problems with film insert molding and two-color molding can be solved complementarily by combining a film insert molding process and the two-color molding process that have conventionally been used for different purposes, which resulted to the present invention.

That is to say, the present invention provides an injection molding method including the steps of:

preparing a die assembly that includes a slide die and can define a primary molding section and a secondary molding section adjacent to the primary molding section according to the position of the slide die;

inserting a preformed film into the primary molding section;

injecting a first resin material into the primary molding section so as to mold a first part; and injecting a second resin material into the secondary molding section including a part of the surface of the film of the first part as a joint surface so as to mold a second part connected to the first part via said joint surface.

According to the present invention, by using the injection molding method described above, different textures or color tones are obtained between the surface of the first part in which the film is inserted and the surface of the second part formed of the second resin material. Moreover, the film end face is not exposed to the surface side in a boundary part between the first part and the second part, and problems of shift of trimming line and corrosion or peeling of the end face do not occur. Also, since the surface of the first part is covered with the film insert, for the first resin material, the material can be selected based on the requirements such as strength, durability, and cost, regardless of texture and color tone. Also, even in the case in which the thermal adhesive properties between the first and second resin materials are low, molding can be performed if the materials have thermal adhesive properties to the film.

In the above-described injection molding method, a multilayer film, which includes a back surface layer having thermal adhesive properties to the first resin material and a top surface layer having thermal adhesive properties to the second resin material, is used. Thereby, the injection molding method in accordance with the present invention can be carried out even in the case in which the first resin material and the second resin material do not have mutual thermal adhesive properties.

Also, in the above-described injection molding method, the end face of the joint surface of the film is covered with a joint part between the first part and the second part. In other words, the configuration is made such that the end face of the joint surface of the film terminates in a middle portion of the joint part between the first part and the second part. Thereby, the end face of film is treated simultaneously with the molding, which is advantageous in terms of manufacturing cost. Also, a molded component having good appearance including the back surface side and high weather resistance can be obtained.

Furthermore, in the above-described injection molding method, the die assembly includes a stationary die half and a movable die half provided so as to be capable of advancing and retracting with respect to the stationary die half, and the slide die includes a stationary slide die half that is slidable with respect to the stationary die half and a movable slide die half that is slidable with respect to the movable die half;

in a state in which the die assembly is closed, the stationary slide die half and the movable slide die half can move integrally between a first position at which the primary molding section is defined in the die, and a second position at which the secondary molding section is defined between the stationary slide die half and the movable slide die half so as to be adjacent to the primary molding section; and after the preformed film has been inserted into the stationary die half, the stationary die half and the movable die half are closed, and the stationary slide die half and the movable slide die half are positioned at the first position, and after the first resin material has been injected into the primary molding section to mold the first part, the stationary slide die half and the movable slide die half are positioned at the second position, and the second resin material is injected into the secondary molding section to mold the second part.

Therefore, a dedicated slide core for defining the primary molding section by dividing the interior of the die is unnecessary, and the slide core is substituted by the stationary slide die half and the movable slide die half that define the secondary molding section, so that the injection molding method can be carried out even in the case in which a space (thickness of member) that allows the retraction of the dedicated slide core cannot be secured in the boundary part between the first part and the second part or in the case in which the second part has through holes. Also, a problem of damage etc. to the mold surface caused by the contact with the dedicated slide core does not occur. Furthermore, the stationary slide die half and the movable slide die half that define the secondary molding section serve as a guide for the film on the joint surface, so that the film can be set easily and reliably. Also, a pin or the like for positioning the film is unnecessary no matter the shape of the primary molding section.

DETAILED DESCRIPTION OF THE INVENTION

The present invention now will be described more fully hereinafter in which embodiments of the invention are provided with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise.

Unless otherwise defined, all technical and scientific terms used herein have the same meaning as commonly understood by one of ordinary skill in the art to which this invention belongs.

Hereinafter, preferred embodiments of the present invention will be described. However, it is to be understood that the present invention is not limited thereto.

An embodiment of the present invention will now be described in detail with reference to the accompanying drawings.

Figure 1:
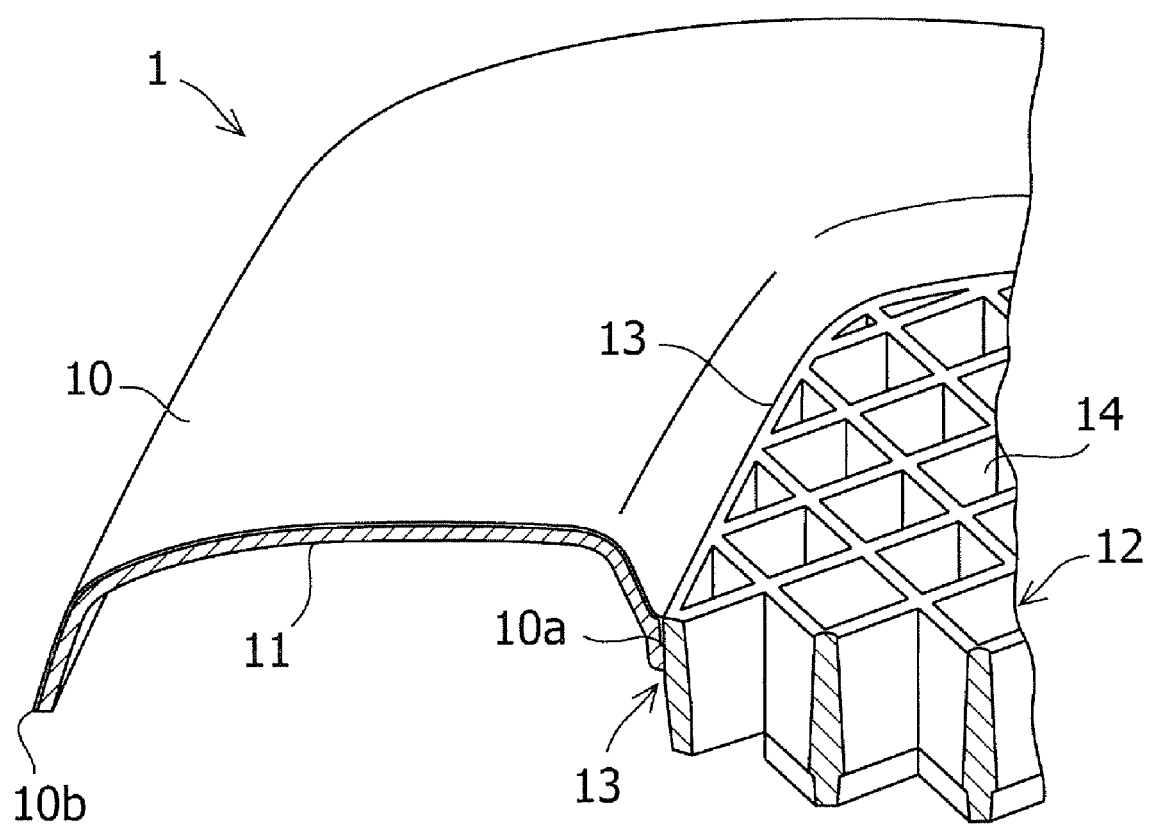
FIG. 1 is a perspective view showing an embodiment of a molded component manufactured by an injection molding method in accordance with the present invention.
Figure 2:
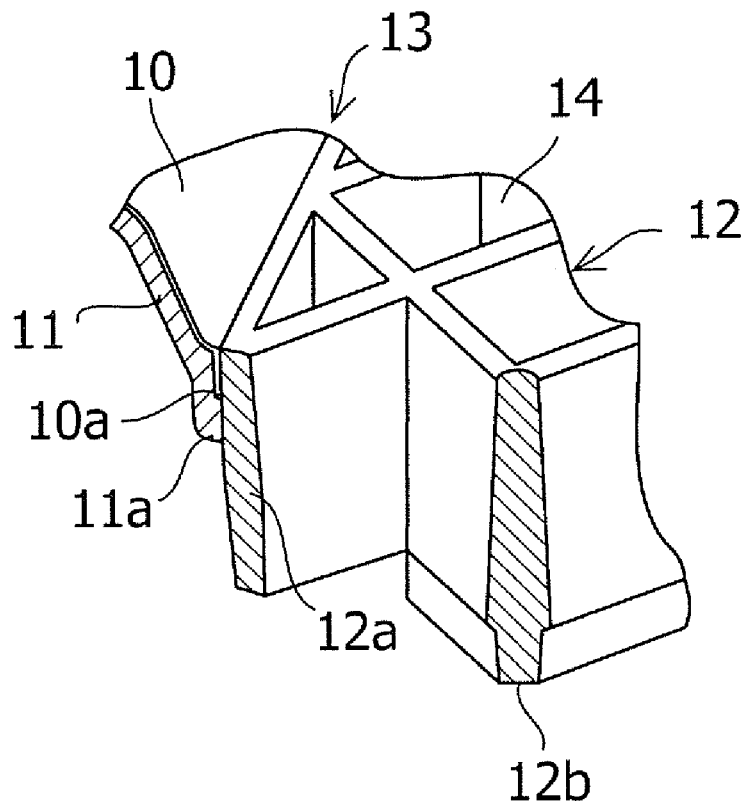
FIG. 2 is an enlarge perspective view of an essential portion of the molded component shown in FIG. 1.

FIG. 1 is a perspective view showing an embodiment of a molded component manufactured by an injection molding method in accordance with the present invention, and FIG. 2 is an enlarge perspective view of an essential portion of the molded component shown in FIG. 1. A molded component 1 is assumed to be a radiator grille of an automobile, and each figure shows only one corner portion thereof. In FIG. 1, the molded component 1 is formed by a frame part 11 formed along the outer periphery and a central mesh part 12. These parts are joined along a boundary part 13. The mesh part 12 is formed into a slantwise lattice shape defining a large number of through holes 14 on the inside of a peripheral edge part 12a along the boundary part 13. On the back surface side of the mesh part 12, a removal preventive rib 12b, for use at the time of mold release, described later, is provided and projects.

Figure 3:
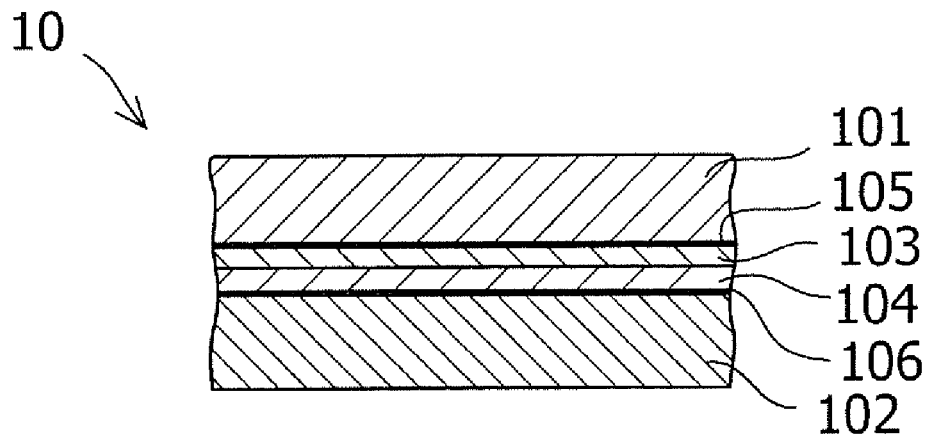
FIG. 3 is a partial sectional view of a film used for film insert.

The top surface portion of the frame part 11 is covered with a film 10. For example, as shown in FIG. 3, the film 10 is formed by an acrylic film having a high weather resistance in a top surface layer 101, a polyester film for decorating, in which a metal 104 is deposited on the back surface side thereof, in a middle layer 103, and an ABS film in a back surface layer 102. As the film 10, a film for film insert having a multilayer structure in which the three layers are joined to each other via adhesive layers 105 and 106 is used.

For such a molded component (radiator grille), it is advantageous that as the base material for the frame part 11 the surface of which is covered with the film 10, a low-cost resin material (first resin material) that is not required to have good appearance and high weather resistance is used, and on the other hand, as the material for the mesh part 12 that is required to have high quality, a resin material (second resin material) having good appearance and high weather resistance is used. Therefore, for example, in the case in which low-cost polypropylene (PP) is chosen as the frame part 11, and AES resin (acrylonitrile EPDM styrene resin) is chosen as the mesh part 12, in the conventional two-color molding, the joint strength in the boundary part 13 cannot be obtained, so that the materials must inevitably be changed to other materials.

In contrast, for the molded component I in accordance with the present invention, since the frame part 11 and the mesh part 12 are joined in the boundary part 13 via the film 10, the joining can be performed if the top surface layer 101 (acrylic resin) of the film 10 and the mesh part 12 (AES resin) have thermal adhesive properties, so that the degree of freedom in raw material selection increases remarkably.

Figure 4:
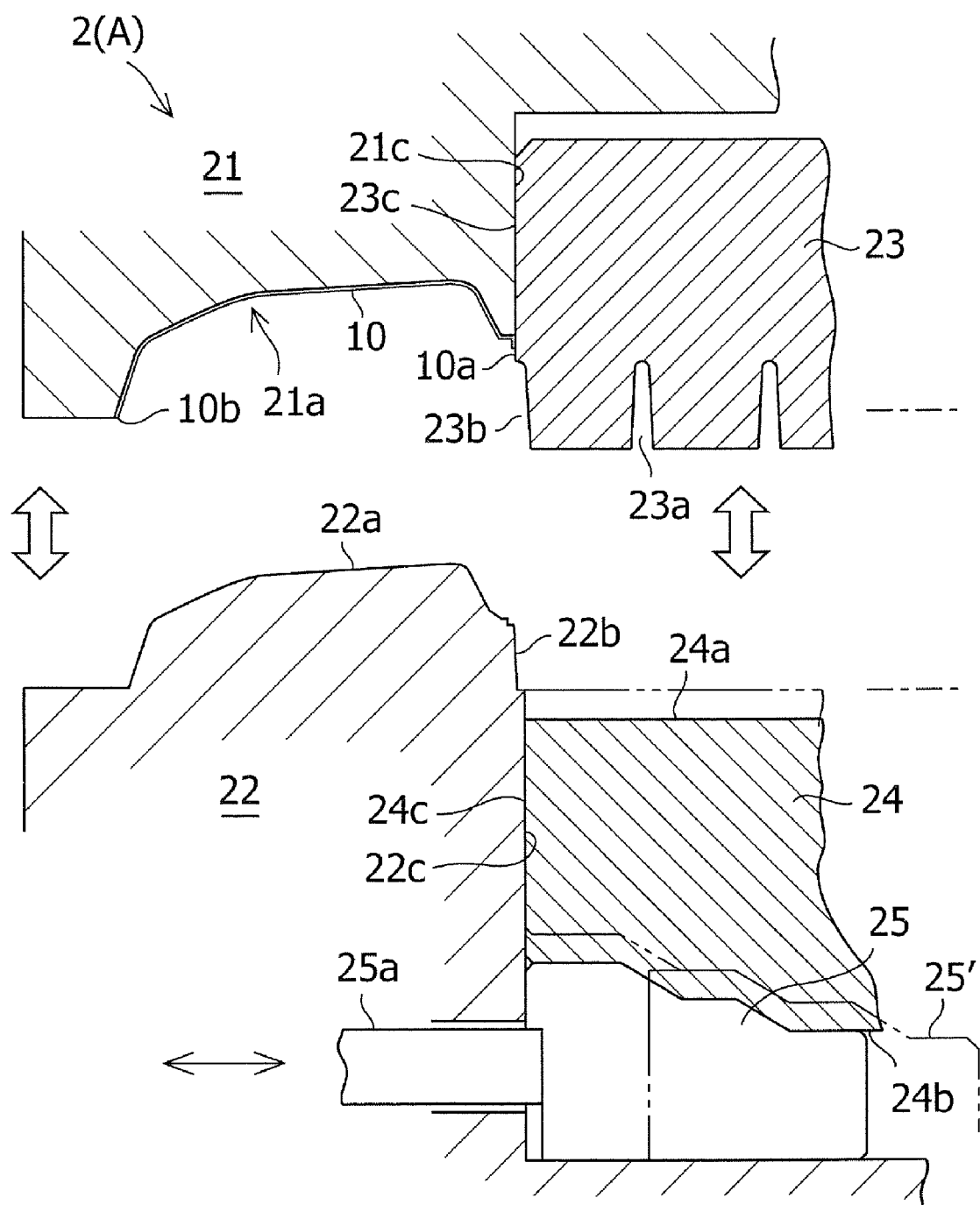
FIG. 4 is a partial sectional view showing a state in which a film is set in a molding apparatus by which the molding method in accordance with the present invention is carried out.
Figure 5:
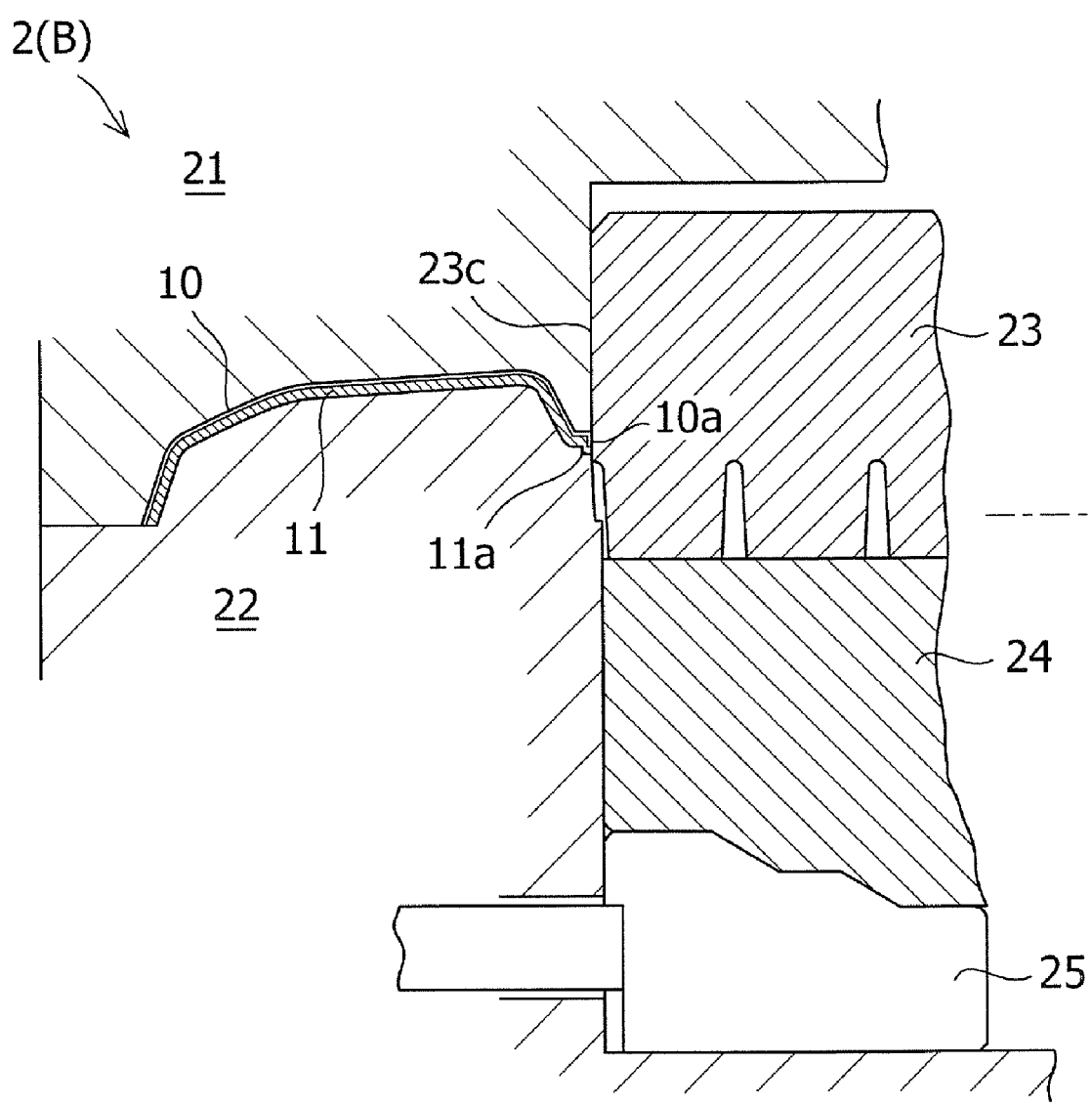
FIG. 5 is a partial sectional view showing primary molding performed by using the molding apparatus shown in FIG. 4.
Figure 6:
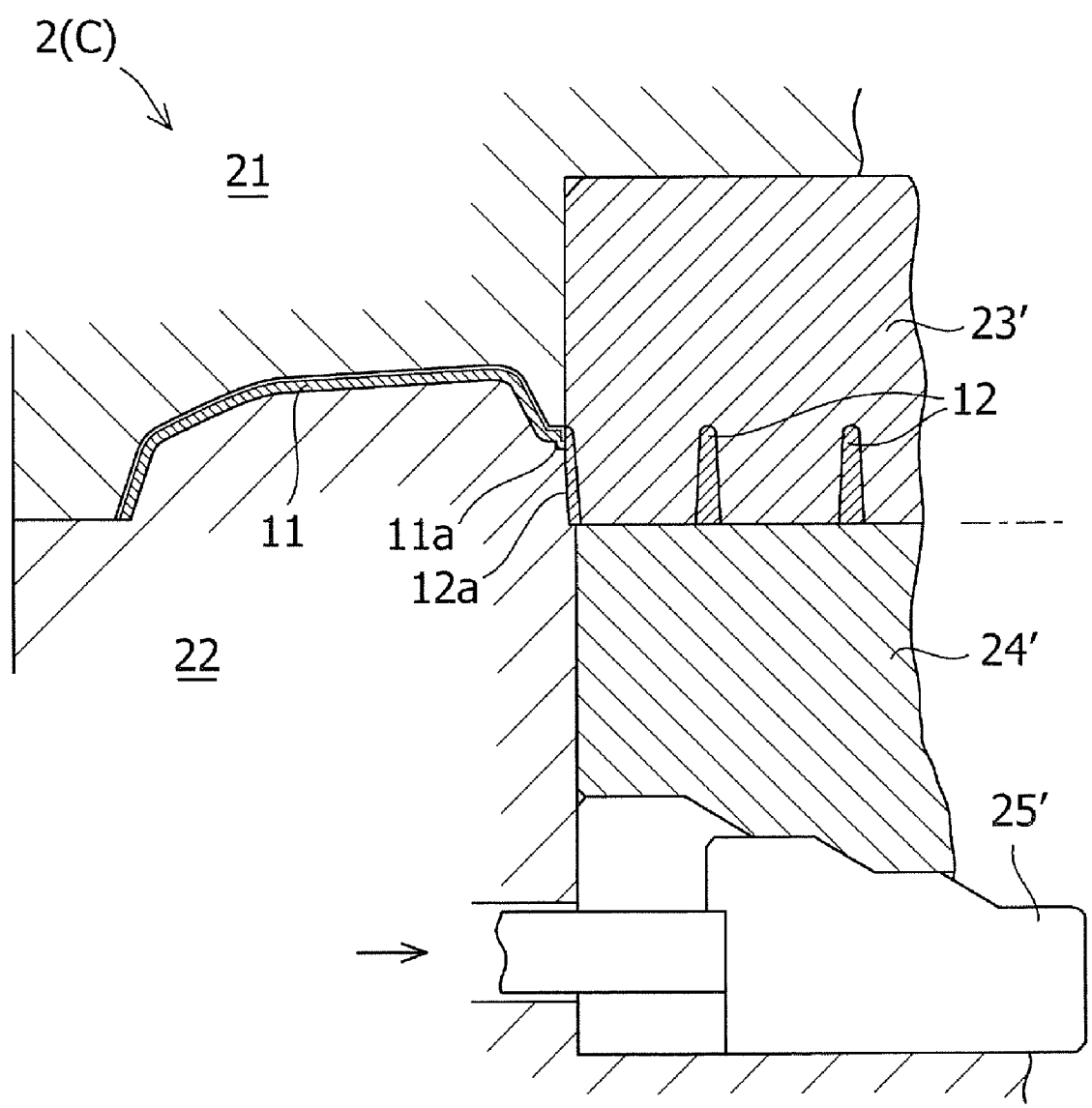
FIG. 6 is a partial sectional view showing secondary molding performed by using the molding apparatus shown in FIG. 4.

FIGS. 4 to 6 show a molding apparatus 2 for molding the molded component 1 in accordance with the present invention. In these figures, the molding apparatus 2 is provided with a pair of molding dies (primary molding dies) consisting of a stationary die half 21 and a movable die half 22 that is provided so as to be capable of being advanced and retracted with respect to the stationary die half 21 by a clamping means such as a hydraulic cylinder, not shown. In the central portion of the molding dies, there is provided a pair of simultaneously slidable slide die halves (secondary molding dies) consisting of a stationary slide die half 23 (slide cavity) slidable with respect to the stationary die half 21 and a movable slide die half 24 (slide core) slidable with respect to the movable die half 22. In FIGS. 4 to 6, a configuration is shown in which the stationary die half 21 and the movable die half 22 are opened and closed in the vertical direction so as to match the direction of the molded component 1. However, at the time of actual molding, the stationary die half 21 and the movable die half 22 are mounted in a horizontal orientation on an injection molding machine, so that the die opening direction is horizontal.

The stationary die half 21 is formed with a cavity 21a of a primary molding section, and the movable die half 22 is formed with a core 22a of the primary molding section. In the state in which the movable die half 22 is joined to the stationary die half 21, a primary molding section (21a, 22a) is defined by the cavity 21a and the core 22a. Also, the stationary slide die half 23 is formed with cavities 23a of a secondary molding section. In the state in which the stationary slide die half 23 and the movable slide die half 24 are joined to each other, a secondary molding section (23a, 24a) is defined by the cavities 23a and a molding surface 24a of the movable slide die half 24.

Furthermore, in the boundary part in which the primary molding dies (21, 22) and the secondary molding dies (23, 24) are adjacent to each other, a secondary molding section (22b, 23b) corresponding to the peripheral edge part 12a is defined by a core side surface 22b of the movable die half 22 and a cavity 23b of the stationary slide die half 23. Also, although it is not shown in FIGS. 4 to 6, on a molding surface 24a of the movable slide die half 24, a cavity corresponding to the removal preventive rib 12b (FIG. 2) is also formed.

Of the paired slide die halves, the stationary slide die half 23 is urged in the direction of projecting with respect to the stationary die half 21 by a spring, not shown, and is at a projecting position with respect to the stationary die half 21 in the die opening state shown in FIG. 4. On the other hand, the movable slide die half 24 is urged in the direction of retracting to the movable die half 22 side by a spring, not shown. In the back surface portion of the movable slide die half 24, a stepped engagement surface 24b including inclined surfaces is formed as shown in FIG. 4. The movable slide die half 24 is configured so as to move between an advanced position indicated by a two-dot chain line in FIG. 4 (secondary molding position shown in FIG. 6) and a retracted position indicated by a solid line in FIG. 4 (primary molding position or dividing position) so as to correspond to the advanced position (25') and the retracted position (25) of a stepped cam 25 engaging with the engagement surface 24b.

The stepped cam 25 is connected to a piston rod of a fluid pressure cylinder, not shown, via a rod 25a. The stepped cam 25 is configured so as to be capable of being advanced and retracted in the direction perpendicular to (or crossing) the slide direction of the movable slide die half 24 by the operation of the fluid pressure cylinder by being guided by the inner bottom surface of the movable die half 22, so that the stepped cam 25 can move between the advanced position (25') and the retracted position (25).

The stepped cam 25 can receive a clamping pressure of the primary molding dies (21, 22) by using the flat bottom surface and the flat surface of the stepped portion. At the secondary molding position shown in FIG. 6, the clamping pressure of the primary molding dies (21, 22) is transmitted to the movable slide die half 24 via the stepped cam 25, and a clamping force can be generated between the movable slide die half 24 and the stationary slide die half 23 which comes into contact with the inner bottom surface of the stationary die half 21 and the retracted position which is regulated.

Next, the molding process of the molded component 1 based on the above-described embodiment is explained with reference to FIGS. 4 to 6.

When the molded component 1 is molded, first, the film 10 is preformed so as to suit the surface shape of the frame part 11. At this time, an edge part 10a extending along the boundary part 13 is also formed. Next, as shown in FIG. 4, the preformed film 10 is inserted into the cavity 21a in the stationary die half 21 that is at an opened position. At this time, the edge part 10a on the inside of the film 10 is positioned by a side surface 23c of the stationary slide die half 23 that is at a projection position with respect to the stationary die half 21. At this time, the stepped cam 25 is at a retracted position, and therefore the movable slide die half 24 retracts to the movable die half 22 side.

From this state, as shown in FIG. 5, the primary molding dies (21, 22) are closed, and the first resin material is injected into the primary molding section (21a, 22a), by which the frame part 11 is insert-molded. At this time, the boundary part between the primary molding section (21a, 22a) and the secondary molding section (23a, 24a) is closed by the side surface 23c of the stationary slide die half 23, and an edge part 11a of the frame part 11, which reaches the lower portion of the edge part 10a of the film 10, is formed.

Next, the stepped cam 25 is advanced, and the movable slide die half 24 and the stationary slide die half 23 are slid at the same time, as shown in FIG. 6. When the second resin material is injected into the secondary molding section (23a, 24a and 23b, 22b) to mold the mesh part 12 in the state in which the secondary molding section (23a, 24a) is caused to coincide with the joint surface (10a, 11a) of the primary molding section (21a, 22a), the peripheral edge part 12a of the mesh part 12 is thermally adhered (fusion bonded) to the edge part 10a of the film 10 positioned on the joint surface (10a, 11a). Thereby, the mesh part 12 is integrally joined to the frame part 11. Thereafter, at the same time that the movable die half 22 is separated from the stationary die half 21, the movable slide die half 24 separates from the stationary slide die half 23, by which the molded component 1 (10, 11, 12) is removed.

For the molded component 1 molded as described above, even if the edge part 10a of the film 10 is somewhat displaced by thermal shrinkage etc. at the primary molding time, since the edge part 10a is covered with the edge part 11a of the frame part 11 and the peripheral edge part 12a of the mesh part 12 as shown in FIG. 2, the displacement does not appear on the surface, and the appearance is not marred. Therefore, the trimming line need not be set strictly in the edge part 10a of the film 10. Also, the end face of the edge part 10a is not exposed to the outside, and problems of corrosion, peeling, etc. do not occur. In the case of the molded component 1 such as a radiator grille, an edge part 10b on the outer periphery side of the film 10 is hidden by a part such as a fender or a hood, so that ordinary trimming treatment suffices.

For the molded component 1 of the above-described embodiment, since the mesh part 12 is joined to the frame part 11 by the peripheral edge part 12a having a small thickness, a space that allows the advance and retraction of the dedicated slide core for closing the boundary part of the primary molding section (21a, 22a) cannot be secured on the secondary molding section (23a, 24a) side. In the molding apparatus 2 of this embodiment, however, the stationary slide die half 23 and the movable slide die half 24 themselves, which constitute the secondary molding section (23a, 24a), slide integrally to close the boundary part of the primary molding section (21a, 22a). Therefore, naturally, ordinary trimming treatment suffices, and in addition, it is possible to provide an advantage in that breakage and burrs of the die caused by the contact of slide core are minimized. Also, when the stationary slide die half 23 and the movable slide die half 24 slide integrally, these dies come into sliding contact with the joint surface (10a, 11a) of a primary molded component (10, 11). However, since the joint surface (10a, 11a) is covered with the secondary molded section (12a), a flaw etc. induced by the sliding contact does not pose a problem.

In the above-described embodiment, the case in which the film 10 has a multilayer structure is shown. However, a film having a single layer can also be used if it has adhesive properties to the first and second resin materials. Also, in the case in which there is no film having adhesive properties to both of the first and second resin materials, a single-layer having adhesive properties to one of these materials, for example, the second resin material (12) is used, and a binding material (adhesive) for the first resin material (11) is applied on the back surface of the film by printing or other means. By doing this, even a single-layer film having no adhesive properties to either one of these materials can be used. Furthermore, a translucent film can be used to change the color tone and texture of the first resin material (11).

Thus, with the injection molding method in accordance with the present invention, by combining the compositions of the first and second resin materials (11, 12) and the film (10), a variety of molded components suitable to the usage objective, such as texture, color tone, design, durability, weather resistance, moldability, and cost, can be formed. Therefore, the injection molding method in accordance with the present invention can be carried out to produce various molded components including interior and exterior parts of automobiles.

The above is a description of an embodiment of the present invention. The present invention is not limited to the above-described embodiment, and various modifications and changes can further be made based on the technical concept of the present invention.

For example, in the above-described embodiment, the case in which the molding apparatus equipped with slide die halves (23, 24) is used has been shown. However, for the molded component having no through holes 14, a molding apparatus equipped with only one slide die can be used. Also, in the above-described embodiment, the case in which the second part (12) is provided on the inside of the first part (10, 11) in which the film 10 is inserted has been shown. However, the arrangement of the first and second parts is not limited to this. In addition, even in the case in which the second part is provided on the outside of the first part or the case in which the first part and the second part are adjacent to each other, the injection molding method in accordance with the present invention can be carried out by appropriately changing the layout of the molding dies and the slide die halves.

What is claimed is:

1. An injection molding method comprising the steps of:
preparing a die assembly which includes a slide die and can define a first molding section and a secondary molding section adjacent to the primary first molding section according to the position of the slide die;
inserting a preformed film into the first molding section;
injecting a first resin material into the first molding section so as to mold a first part; and
injecting a second resin material that is dissimilar, has low thermal adhesive properties to the first resin material and has thermal adhesive properties to the film, into the secondary molding section which is partially defined by a top surface of the film as at least part of a boundary surface between the first and the second molding sections so as to mold a second part connected to the first part via said boundary surface;
the die assembly further includes a stationary die half and a movable die half provided so as to be capable of advancing and retracting with respect to the stationary die half, and the slide die includes a first slide die half slidable with respect to the stationary die half and a second slide die half slidable with respect to the movable die half;
in a state in which the die assembly is closed, the first and second slide die halves can slide integrally between a first position at which the first molding section is defined in the die assembly and a second position at which the second molding section is defined between the first and second slide die halves adjacent to the first molding section; and
after the preformed film has been inserted into the stationary die half, the stationary die half and the movable die half are closed, and the first and second slide die halves are positioned at the first position, and after the first resin material has been injected into the first molding section to mold the first part, the first and second slide die halves are positioned at the second position, and the second resin material is injected into the secondary molding section to mold the second part.

2. The injection molding method according to claim 1, wherein the preformed film is made from a multilayer film, which includes a back surface layer having thermal adhesive properties to the first resin material and a top surface layer having thermal adhesive properties to the second resin material.

3. The injection molding method according to claim 1, wherein said boundary surface includes a directly jointed part between the first part and the second part adjacent to an edge part of the preformed film located in the boundary surface, and wherein the step of injecting the second resin material, an end face of the edge part of the preformed film is covered with the directly jointed part between the first part and the second part.

* * * * *

UNITED STATES PATENT AND TRADEMARK OFFICE
CERTIFICATE OF CORRECTION

| | | |
|---|---|---|
| PATENT NO. | : 7,858,013 B2 | |
| APPLICATION NO. | : 12/190331 | |
| DATED | : December 28, 2010 | |
| INVENTOR(S) | : Izumo | |

It is certified that error appears in the above-identified patent and that said Letters Patent is hereby corrected as shown below:

On Title Page:

Item (75) Inventor: Please correct "Hamamatsu" to read -- Hamamatsu-shi --

Signed and Sealed this
Thirty-first Day of May, 2011

David J. Kappos
*Director of the United States Patent and Trademark Office*